US012090678B1

(12) United States Patent
Liu

(10) Patent No.: US 12,090,678 B1
(45) Date of Patent: Sep. 17, 2024

(54) CUTTER ASSEMBLY, PAPER CUTTING DEVICE AND PAPER CUTTER

(71) Applicant: Yong Liu, Zhejiang (CN)

(72) Inventor: Yong Liu, Zhejiang (CN)

( * ) Notice: Subject to any disclaimer, the term of this patent is extended or adjusted under 35 U.S.C. 154(b) by 0 days.

(21) Appl. No.: 18/539,909

(22) Filed: Dec. 14, 2023

Related U.S. Application Data

(63) Continuation-in-part of application No. 18/119,848, filed on Mar. 10, 2023.

(51) Int. Cl.

| | |
|---|---|
| ***B26B 27/00*** | (2006.01) |
| ***B26B 29/06*** | (2006.01) |
| ***B26D 1/01*** | (2006.01) |
| ***B26D 1/04*** | (2006.01) |

(52) U.S. Cl.
CPC .......... *B26D 1/015* (2013.01); *B26D 2210/11* (2013.01)

(58) Field of Classification Search
CPC ........... B26B 27/00; B26B 3/08; B26B 29/06; B26D 2001/006; B26D 1/045; B26D 2210/11; B65H 2701/5112; B65H 35/002; B65H 2301/51532; B65H 2701/1944; B65H 2301/515123; B65H 2301/515; B65H 2301/51512; B65H 2301/515126
USPC ......... 83/651, 614, 635, 649; 30/298, 298.4; D8/14, 48, 98; D18/34.3, 34.8
See application file for complete search history.

(56) References Cited

U.S. PATENT DOCUMENTS

| | | | | |
|---|---|---|---|---|
| 1,915,736 | A | 6/1933 | Bennington | |
| 2,294,018 | A * | 8/1942 | Borst | B26B 3/08 30/294 |
| D164,378 | S * | 8/1951 | Mejia | D8/98 |
| 3,028,670 | A * | 4/1962 | Tilly | B43M 7/002 30/294 |
| 5,638,603 | A * | 6/1997 | Li | B26B 27/00 30/294 |
| 8,469,072 | B1 * | 6/2013 | Baca | B65H 35/0073 156/577 |
| 9,193,555 | B2 | 11/2015 | Amano et al. | |
| D915,507 | S * | 4/2021 | Cran | D18/34.9 |
| D968,190 | S * | 11/2022 | Tang | D8/98 |
| D985,353 | S * | 5/2023 | Liu | D8/98 |
| 11,717,977 | B1 * | 8/2023 | Xie | B26B 3/08 30/278 |
| 2015/0059188 | A1 * | 3/2015 | Haas | B26B 3/08 30/279.2 |
| 2018/0345516 | A1 | 12/2018 | Perla | |

* cited by examiner

*Primary Examiner* — Ghassem Alie

(57) ABSTRACT

Provided herein is a paper cutter, including: a paper cutter housing which includes an accommodating space for accommodating a roll of paper to be cut, where a side wall of the paper cutter housing further includes two parallel guide rails, a holding portion is arranged on an outer wall of the paper cutter housing, and a pressure direction of the holding portion is capable of being perpendicular to a plane formed by the two parallel guide rails; and a paper cutting device which is connected to the side wall of the paper cutter housing and includes a cutter assembly, where the cutter assembly includes an object picking member and a cutter, and a direction corresponding to a cutting edge of the cutter is opposite to a paper feeding direction of the paper to be cut.

12 Claims, 5 Drawing Sheets

CUTTER ASSEMBLY, PAPER CUTTING DEVICE AND PAPER CUTTER

CROSS REFERENCE TO RELATED APPLICATION

This application is a continuation in part of U.S. Design application No. 18119848, filed on Mar. 10, 2023, and the entire contents of which are incorporated herein by reference.

TECHNICAL FIELD

The present disclosure relates to a device for cutting roll paper of a paper tube, in particular to a cutter assembly, a paper cutting device and a paper cutter.

BACKGROUND

Paper cutting machines on the market basically need to be assisted by two hands to complete successful cutting, have no automatic paper folding, advancing pressure increasing and positioning systems, and have poor cutting effects, paper is torn very easily, and it is often difficult to align vertical planes of the paper in parallel for cutting, resulting in tearing of the paper or unparallel cutting due to inclination, thereby wasting the paper.

SUMMARY

The present disclosure aims to provide a paper cutter and a cutter assembly and a paper cutting device thereof, the dual-guide-wheel pressing paper cutter can be used by one hand to achieve parallel cutting, paper can be folded automatically by means of an internal structure, the paper can be folded into arches to a great extent, the great tension is provided for the paper, and the cutting success rate is higher.

In order to achieve the above purpose, the present disclosure provides the following technical solution:

- the cutter assembly comprises an object picking member and a cutter, where one end of the object picking member is provided with an object picking end, the other end of the object picking member is connected to a cutter bearing member, the cutter is mounted in the cutter bearing member, and a cutting edge of the cutter corresponds to an advancing direction of paper to be cut.

According to the cutter assembly disclosed in the above technical solution, the object picking end of the object picking member is configured to be capable of quickly separating the paper to be cut from a placement surface therefor, and the paper to be cut is picked and gradually enters a cutting point of the cutter behind.

The present application further discloses the paper cutting device, comprising: a paper cutting device housing; and a cutter assembly which is connected to the paper cutting device housing, where the cutter assembly comprises an object picking member capable of picking paper to be cut away from a placement surface for the paper to be cut, a cutter and a cutter bearing member for mounting the cutter, and a direction corresponding to a cutting edge of the cutter corresponds to a paper feeding direction of the paper to be cut.

The paper cutting device further comprises: a paper pushing member which is connected to the paper cutting device housing, where the paper pushing member is arranged close to a paper feeding end of the paper cutting device housing and is arranged above a paper bottom layer contact surface, and the paper pushing member is connected to the paper cutting device housing by means of a paper pushing and pressing mounting member.

Further, the paper cutting device further comprises: a paper guide member which is connected to the paper cutting device housing, where the paper guide member is arranged close to a paper discharging end of the paper cutting device housing and is arranged above a paper bottom layer contact surface, and the paper guide member is connected to the paper cutting device housing by means of a paper guide mounting member.

According to the above technical solution, the paper is pressed and pushed by two wheels, including the paper pushing member and the paper guide member, to be fed to the cutter, the paper can be folded automatically, the paper can be folded into arches to a great extent, the great tension is provided for the paper, and the cutting success rate is increased.

The present application further discloses the paper cutter, comprising: a paper cutter housing which comprises an accommodating space for axially accommodating a roll of paper to be cut, where a side wall of the paper cutter housing further comprises two parallel guide rails arranged in an axial direction thereof, and the parallel guide rails can serve as contact planes for the paper cutter and a paper cutter placement surface and are applied to positioning, force bearing and supporting during paper cutting and configured to assist the paper cutter in linearly sliding; a holding portion which is arranged on an outer wall of the paper cutter housing, where a direction of pressure applied to the holding portion is capable of being perpendicular to a plane formed by the two parallel guide rails; and a paper cutting device which is fixedly connected to the side wall of the paper cutter housing and comprises a cutter assembly, where the cutter assembly comprises an object picking member and a cutter, the object picking member picks the paper to be cut away from a placement surface for the paper to be cut and feeds the paper towards a cutting edge of the cutter, and a direction corresponding to the cutting edge of the cutter is opposite to a paper feeding direction of the paper to be cut.

With regard to the present disclosure, the two parallel guide rails can serve as contact surfaces for the paper cutter and a placement plane, are applied to positioning, force bearing and supporting during paper cutting and configured to assist the paper cutter in linearly sliding, and are fitted with the top holding portion symmetrically arranged on a support plane formed by the parallel guide rails, thus the pressure applied to the holding portion is perpendicular to the contact planes formed by the parallel guide rails, and thrust applied to the holding portion is parallel to a paper discharging direction, thereby keeping effective forward pushing and cutting of the paper cutter during cutting; and the cutter assembly comprises the object picking member which can automatically pick the paper to be cut away from the placement surface for the paper to be cut, without the assistance by the other hand, the object picking member directly assists the paper to be cut in entering a cutting waiting zone, the process is more convenient and quick, and the time is saved.

Further, a free end of the object picking member is an object picking end, and the object picking end is capable of picking the paper to be cut away from the placement surface therefor.

Further, the object picking member further comprises a paper bottom layer contact surface extending from the object picking end to the cutting edge, and the paper bottom layer contact surface is a bearing surface for the paper to be cut.

Further, the paper bottom layer contact surface is a slope gradually rising from the object picking end to the cutting edge.

Further, the paper cutting device further comprises a paper cutting device housing and a paper pushing member, the paper pushing member is arranged close to a paper feeding end of the paper cutting device housing and is arranged above a paper bottom layer contact surface, and the paper pushing member is fixedly connected to the paper cutting device housing by means of a paper pushing and pressing mounting member.

Further, the paper cutting device further comprises a paper cutting device housing and a paper guide member, the paper guide member is arranged close to a paper discharging end of the paper cutting device housing and is arranged above a paper bottom layer contact surface, and the paper guide member is fixedly connected to the paper cutting device housing by means of a paper guide mounting member.

Further, the cutting edge of the cutter is inclined relative to the paper bottom layer contact surface.

Further, an obtuse angle is formed between an inclination direction of the cutting edge of the cutter and the paper feeding direction of the paper to be cut.

Further, a bottom edge of the paper cutting device housing comprises an end surface in contact with the placement surface for the paper to be cut, and the end surface of the bottom edge of the paper cutting device housing is capable of serving as a paper pressing assistance member.

Further, the paper cutting device housing is further provided with a cutter assembly mounting groove, the cutter assembly is provided with an elastic buckle, and the elastic buckle is fitted with the cutter assembly mounting groove to connect the cutter assembly to the paper cutting device housing.

Further, the paper discharging end of the paper cutting device housing is provided with a paper discharging groove which is configured to discharge the paper after paper cutting.

Further, the paper cutting device further comprises a cutter bearing member which comprises a cutting blade mounting groove, and the cutter is detachably mounted in the cutting blade mounting groove.

Further, the paper cutter further comprises the holding portion which is arranged on the outer wall of the paper cutter housing.

Further, a force is capable of being applied to the holding portion in a downward inclined direction.

Further, a force is applied to the holding portion such that the paper cutter is subjected to: the pressure perpendicular to the plane formed by the two parallel guide rails; and the thrust parallel to the paper discharging direction of the paper to be cut.

It can be seen from the analysis that the present disclosure discloses the paper cutter, by means of the dual-guide-wheel pressing paper cutter, the paper can be folded automatically, the paper can be folded into arches to a great extent, the great tension is provided for the paper, and the cutting success rate is increased. The paper is first pressed by the paper pushing member, then is folded once into an arch under the interaction with the slope of the paper bottom layer contact surface corresponding to the object picking member, and then is folded again by the paper guide member to form a smaller arch, under the action of the paper guide member, the stress of the paper to be cut is gradually increased, a tip of the paper is folded by the paper guide member, thus the great tension and stiffness are provided for the paper, and the paper is cut apart easily when hitting against the cutting edge in the small arch state. In addition, a large arched paper distributor is provided on a right side of the cutting device and can accommodate any paper roll with the diameter less than 8 cm, the paper can be pulled at will to adjust the required paper length, after the required length is determined, the paper is sent into the paper pushing member by the object picking member for compression, the paper enters the paper guide member for folding, and then the paper is cut by the cutter. With the technical solutions of the present disclosure, the operation difficulty is reduced, the replacement time is greatly shortened, the working intensity is greatly reduced, and meanwhile, the cost is saved.

BRIEF DESCRIPTION OF THE DRAWINGS

Drawings constituting a portion of the present application are used for providing a further understanding to the present disclosure. Schematic embodiments of the present disclosure and descriptions thereof are intended to explain the present disclosure, and should not be construed to unduly limit the present disclosure. In the drawings.

DESCRIPTION OF REFERENCE NUMERALS

Figure 1:
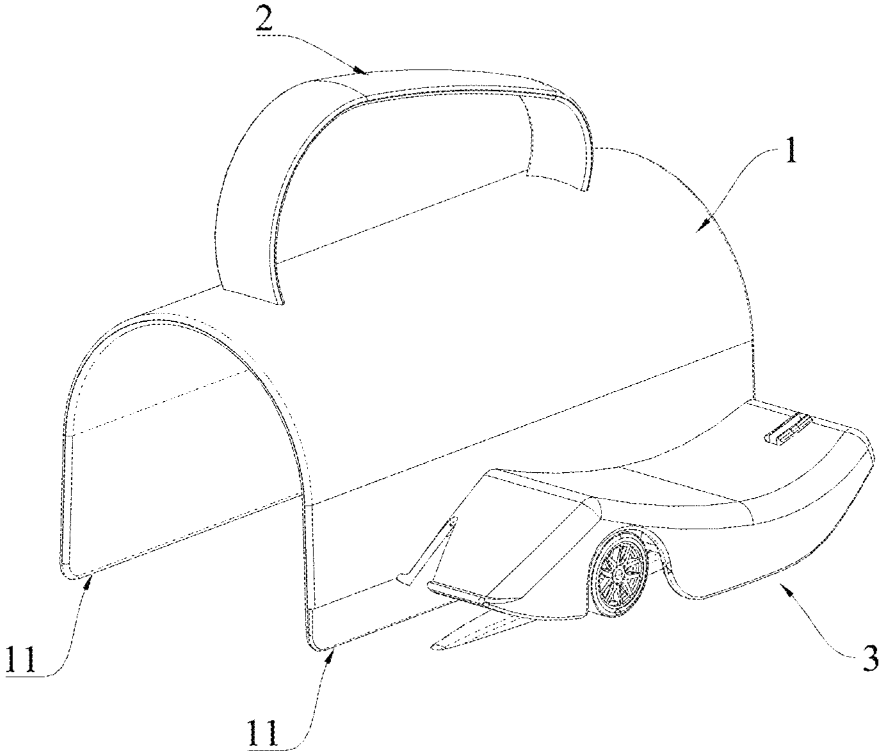
FIG. 1 is a three-dimensional structure diagram of a paper cutter in an embodiment of the present disclosure.

1—paper cutter housing; 2—pressing handle; 3—paper cutting device; 11—parallel guide rail; 31—cutter assembly; 32—cutter assembly mounting groove; 33—paper cutting device housing; 34—paper pushing and pressing mounting member; 35—paper pushing member; 36—paper guide mounting member; 37—paper guide member; 38—first paper discharging groove; 39—second paper discharging groove; 311—object picking member; 3111—object picking end; 3112—paper bottom layer contact surface; 312—cutter; 3121—cutting edge; 313—cutter bearing member; 3131—elastic buckle; 314—cutting blade mounting groove; 3231—elastic buckle mounting groove; and 331—bottom edge.

DETAILED DESCRIPTION OF THE EMBODIMENTS

The present disclosure is described in detail below with reference to the accompanying drawings and in conjunction with embodiments. Each example is provided to explain the present disclosure instead of limiting the present disclosure. In fact, those skilled in the art will know that modifications and variations may be made in the present disclosure without departing from the scope or spirit of the present disclosure. For example, features shown or described as part of one embodiment may be used in another embodiment to produce yet another embodiment. Therefore, it is expected that the present disclosure includes such modifications and variations that fall within the scope of the appended claims and equivalents thereof.

In the descriptions of the present disclosure, orientations or positional relationships indicated by the terms "longitudinal", "transverse", "upper", "lower", "front", "rear", "left", "right", "vertical", "horizontal", "top", "bottom" and the like are orientations or positional relationships based on the drawings, are only for the purpose of facilitating describing of the present disclosure, and do not indicate that the present disclosure must be constructed and operated in the specific orientations. Therefore, they cannot be understood as limitations on the present disclosure. The terms "connection", "connecting" and "arrangement" used in the present disclosure should be understood in a broad sense, for example, the connection may be fixed connection, and may also be detachable connection; the connection may be direct connection, and may also be indirect connection by means of intermediate components; the connection may be wired electrical connection and wireless electrical connection, and may also be wireless communication signal connection; and for those of ordinary skill in the art, the specific meanings of the above-mentioned terms can be understood according to the specific situations.

The accompanying drawings show one or more examples of the present disclosure. Numeral and letter marks are used in the detailed descriptions to refer to the features in the accompanying drawings. Similar or like reference signs in the drawings and descriptions have been used to refer to similar or like parts of the present disclosure. As used herein, the terms "first", "second", "third" and the like are used interchangeably to distinguish one component from another, and are not intended to indicate the positions or importance of individual components.

Figure 2:
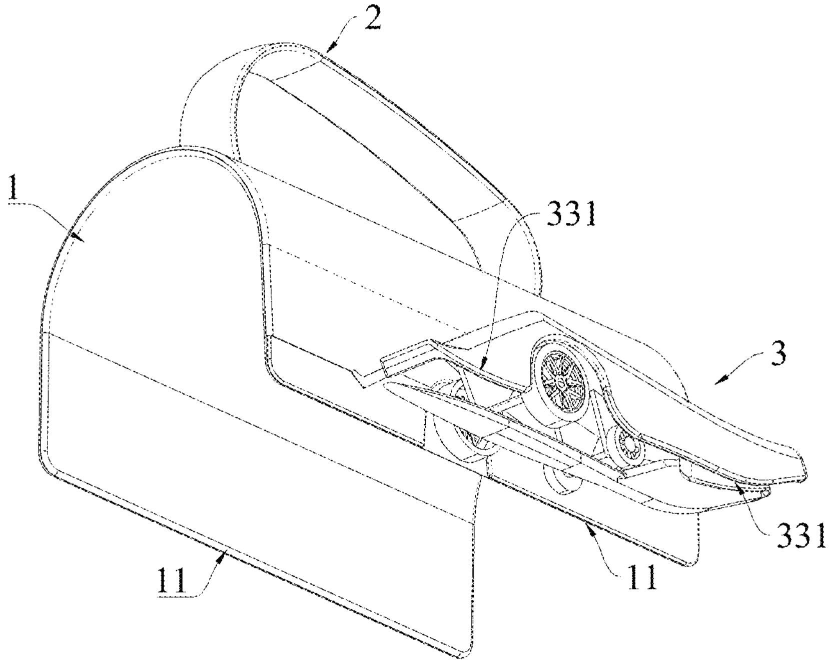
FIG. 2 is a three-dimensional structure diagram of the paper cutter in the embodiment of the present disclosure.
Figure 3:
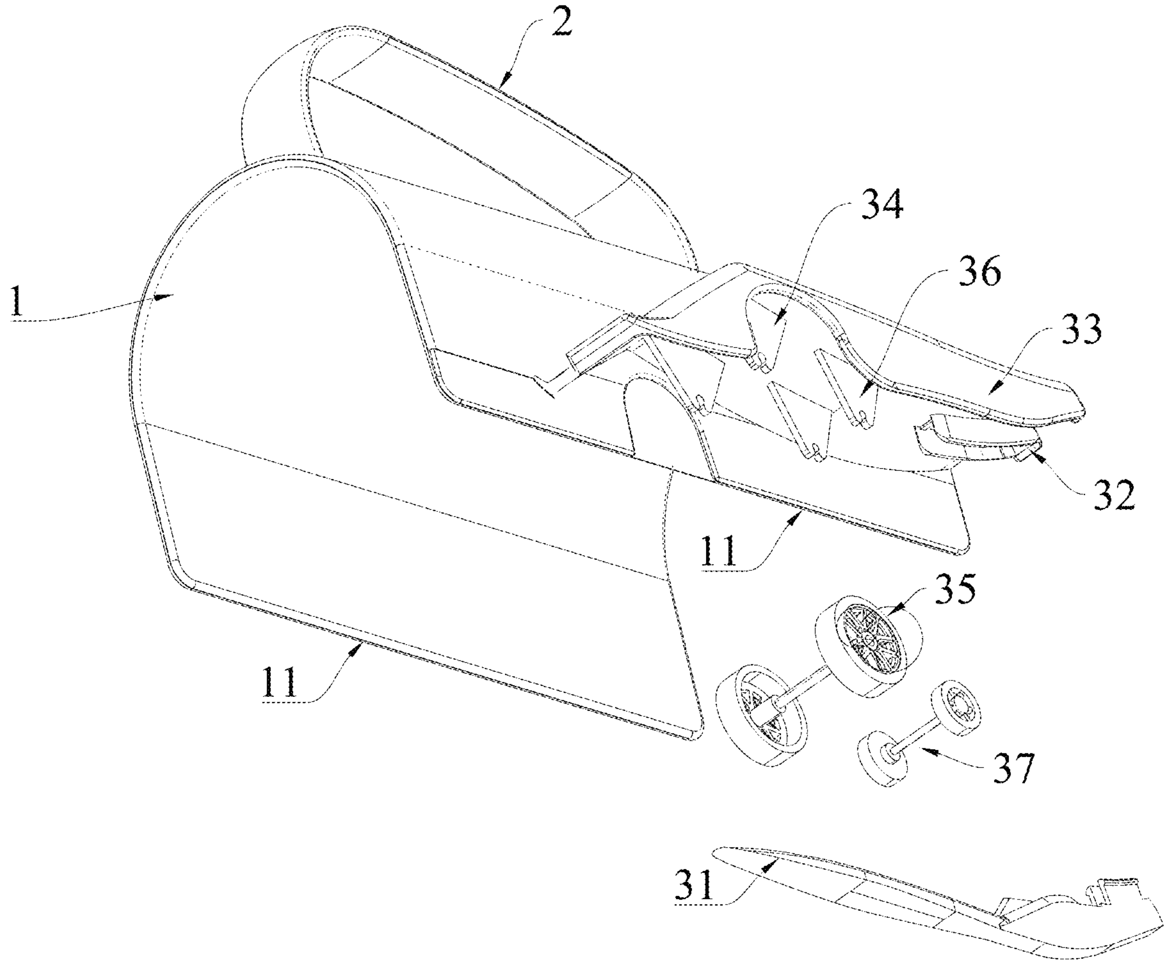
FIG. 3 is an exploded structure diagram of the paper cutter in the embodiment of the present disclosure.
Figure 4:
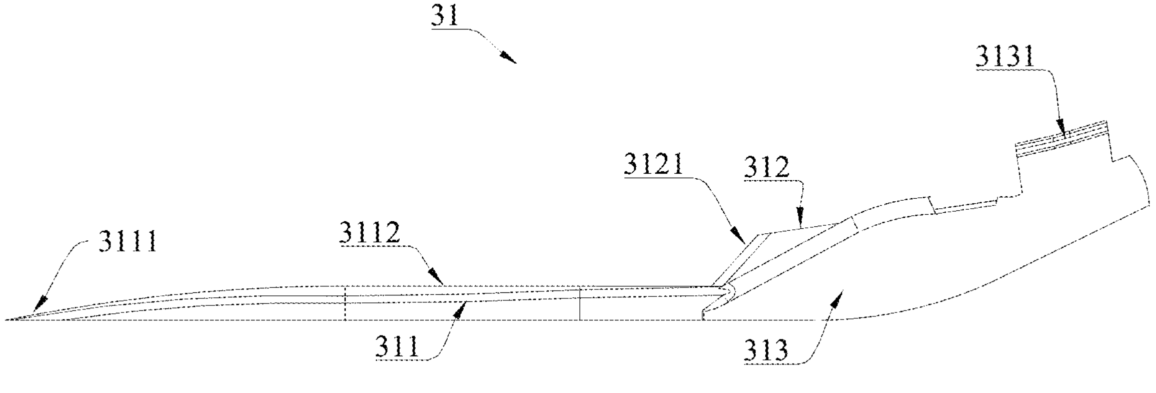
FIG. 4 is a structure diagram of a cutter assembly in the embodiment of the present disclosure.
Figure 5:
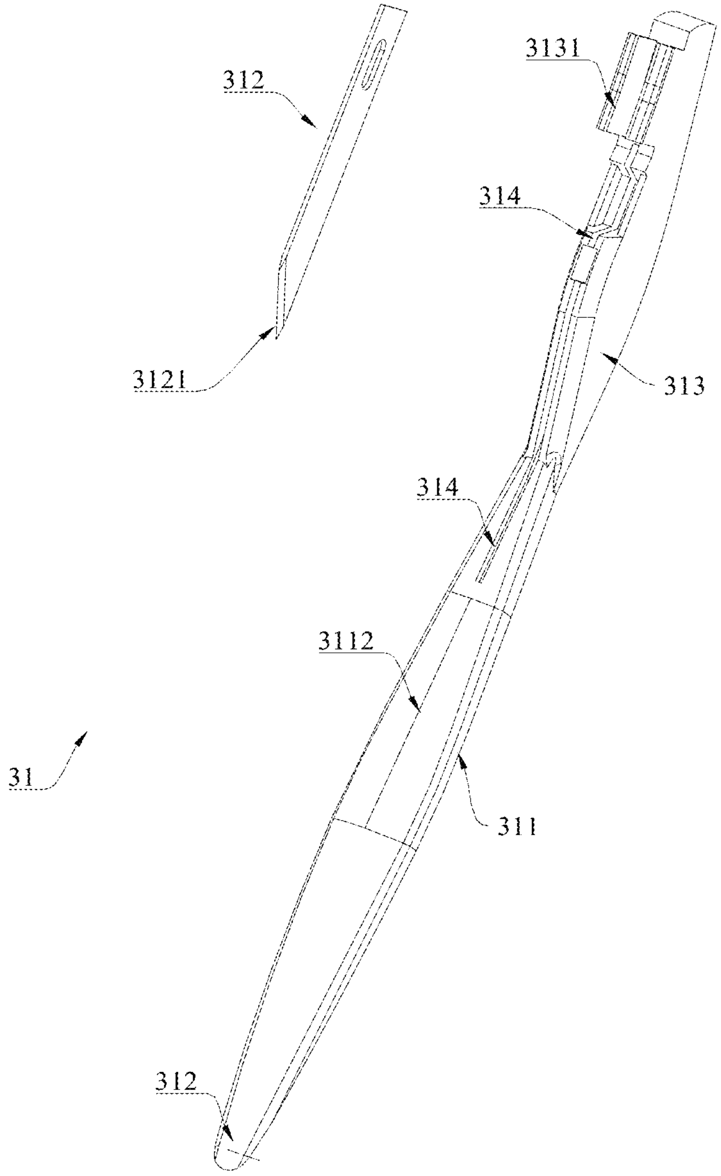
FIG. 5 is an exploded structure diagram of the cutter assembly in the embodiment of the present disclosure.
Figure 6:
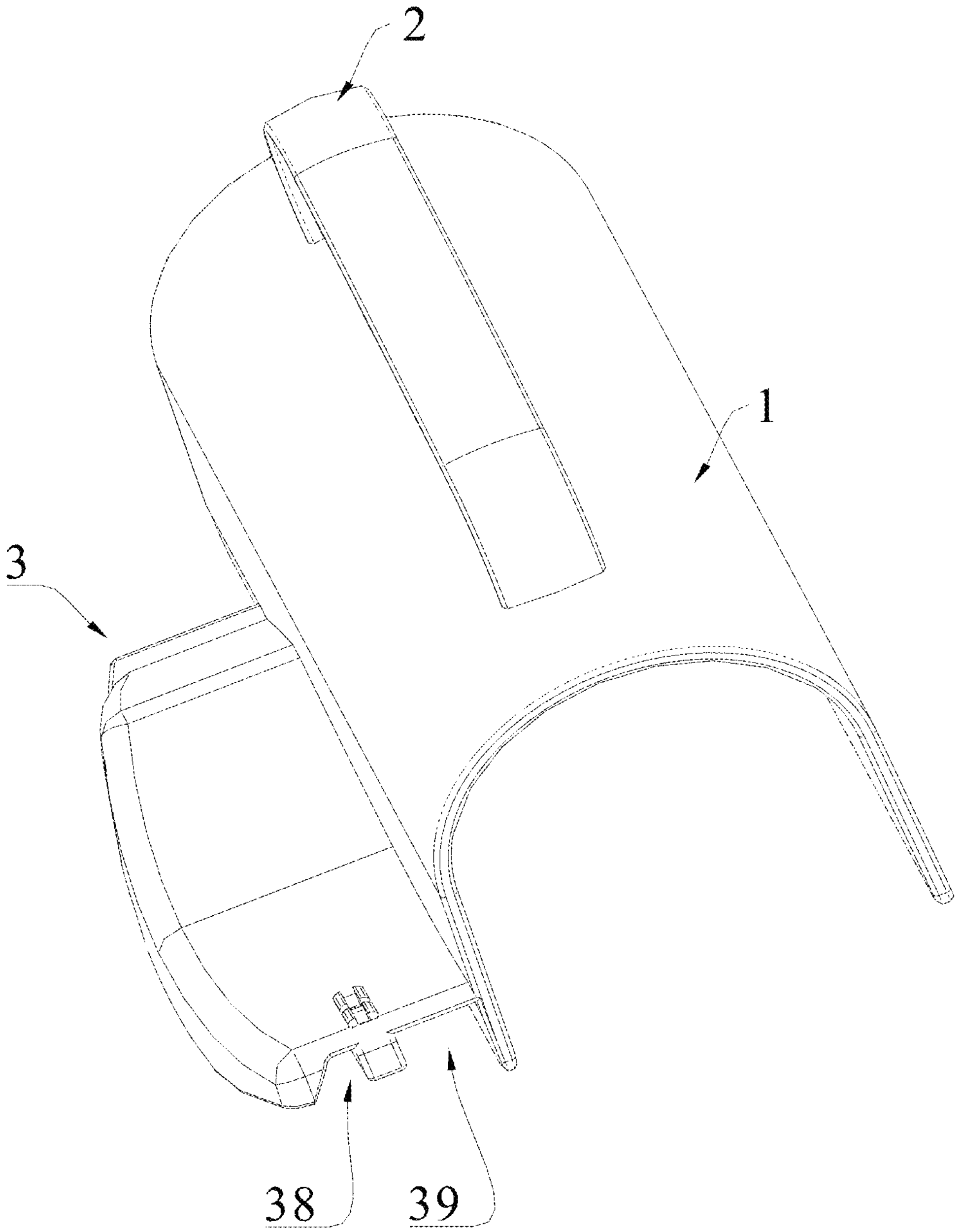
FIG. 6 is a structure diagram of a paper discharging end of the paper cutter in the embodiment of the present disclosure.
Figure 7:
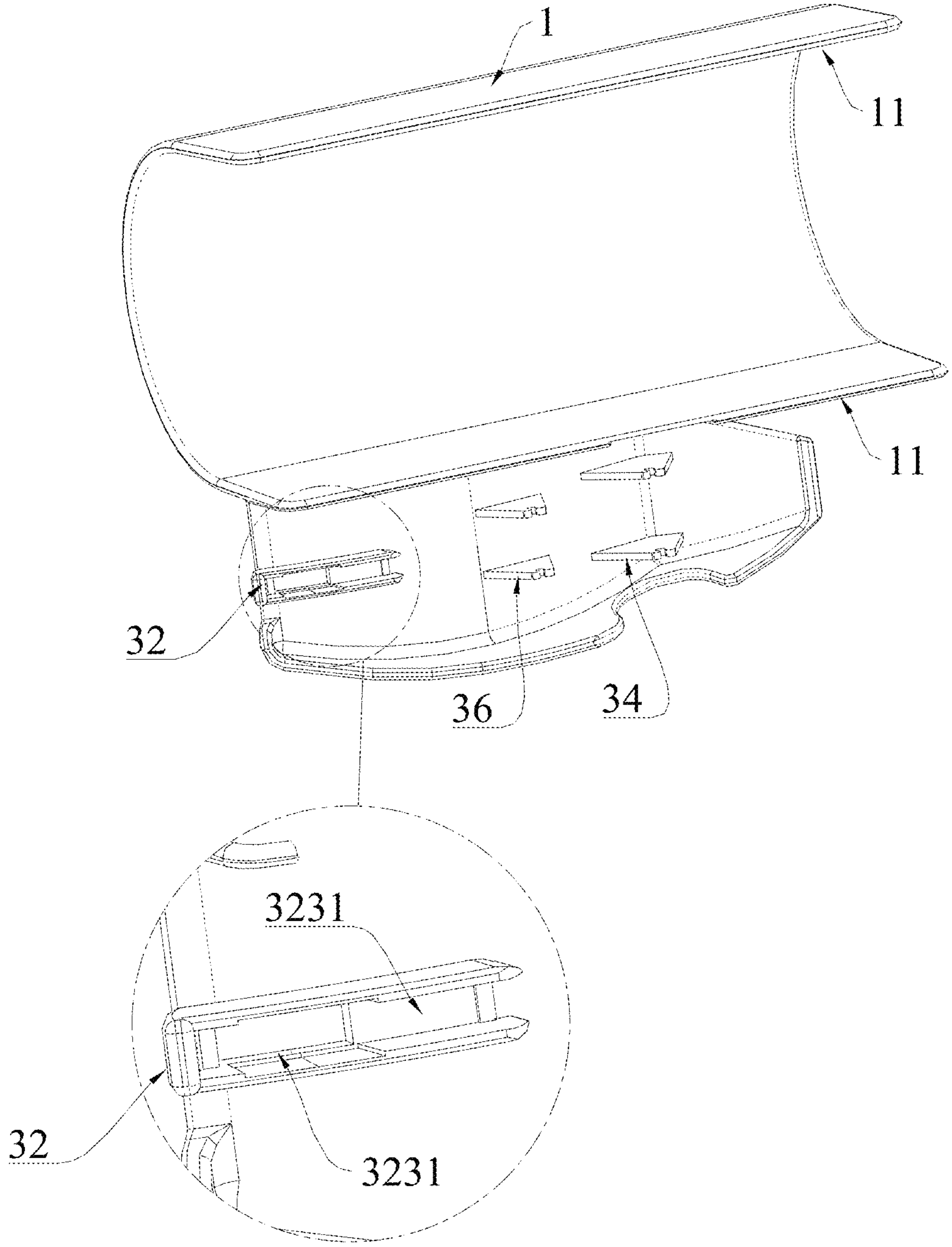
FIG. 7 is a structure diagram of a bottom end of a paper cutting device of the paper cutter in the embodiment of the present disclosure and an enlarged diagram of an elastic buckle mounting groove.

As shown in FIGS. 1-7, according to an embodiment of the present disclosure, a paper cutter is provided and includes a paper cutter housing 1, a holding portion 2 arranged on an outer wall of the paper cutter housing 1 and a paper cutting device 3 fixedly connected to an outer side wall of the paper cutter housing 1.

The paper cutter housing 1 includes an accommodating space for accommodating a roll of paper to be cut, where the side wall of the paper cutter housing 1 further includes two parallel guide rails 11 arranged in an axial direction thereof, and the parallel guide rails 11 can serve as contact planes for the paper cutter and a paper cutter placement surface and are applied to positioning, force bearing and supporting during paper cutting and configured to assist the paper cutter in linearly sliding.

Two component forces are applied in a force application direction of the holding portion 2, pressure is applied in a direction perpendicular to a plane formed by the two parallel guide rails 11, and thrust is applied in a direction parallel to a paper discharging direction, thereby keeping linear cutting of the paper cutter during cutting. The paper cutting device 3 includes a paper cutting device housing 33 and a cutter assembly 31, a paper discharging port close to the paper cutting device housing 33 is provided with a cutter assembly mounting groove 32, the cutter assembly 31 is provided with an elastic buckle 3131, and the elastic buckle 3131 is fitted with the cutter assembly mounting groove 32 to connect the cutter assembly 31 to the paper cutting device housing 33. The cutter assembly 31 is snap-fitted with the paper cutting device housing 33 and can be pressed to be taken out, thereby facilitating replacement of the cutter assembly 31.

The cutter assembly 31 includes an object picking member 311, a free end of the object picking member 311 is an object picking end 3111, the object picking member 311 further includes a paper bottom layer contact surface 3112 extending from the object picking end 3111 to a cutting edge 3121, the paper bottom layer contact surface 3112 is a bearing surface for paper to be cut, the object picking member 311 picks the paper to be cut away from a placement surface for the paper to be cut and feeds the paper towards the cutting edge 3121 of a cutter 312, a direction corresponding to the cutting edge 3121 of the cutter 312 is opposite to a paper feeding direction of the paper to be cut, the cutting edge 3121 of the cutter 312 is inclined relative to the paper bottom layer contact surface 3112, an obtuse angle is formed between an inclination direction of the cutting edge 3121 of the cutter 312 and the paper feeding direction of the paper to be cut, and the obtuse angle is formed to facilitate cutting of the paper at the cutting edge 3121.

The object picking end 3111 picks out the paper to be cut, leaves the placement surface, and then reaches the cutting edge 3121 behind for cutting. The paper bottom layer contact surface 3112 is a slope gradually rising from the object picking end 3111 to the cutting edge 3121, and by means of the rising slope, the paper tends to move forward from low to high. The cutter assembly 31 further includes the cutter 312 and a cutter bearing member 313, the cutter bearing member 313 is provided with a cutting blade mounting groove 314, and the cutter 312 is detachably mounted in the cutting blade mounting groove 314, thereby facilitating replacement of the cutter.

The paper cutting device 3 further includes the paper cutting device housing 33 and a paper pushing member 35, the paper pushing member 35 can be of a rotatable guide wheel structure capable of being in contact with the smooth placement surface for the paper to be cut, the paper pushing member 35 is arranged close to a paper feeding end of the paper cutting device housing 33 and is arranged above the paper bottom layer contact surface 3112, and a wheel axle is fitted with a paper pushing and pressing mounting member 34 to fixedly connect the paper pushing member 35 to the paper cutting device housing 33. It should be noted that the paper pushing member 35 is fixedly connected to the paper cutting device housing 33 in a snap-fitted manner, or is detachably connected in a semi-closed manner, or is fixedly connected in a totally-closed manner. The paper pushing member 35 can rotate relative to the wheel axle, the paper pushing member 35 can press the paper to be cut to rotate and slide towards a cutting edge plane and keeps rolling in the process of pushing the paper to be cut, and the paper pushing member 35 is fitted with the paper bottom layer contact surface 3112, such that the paper is in a tensioned state to reach the maximum tension, and the paper is easy to cut.

The paper cutting device 3 further includes a paper guide member 37, the paper guide member 37 can be of a rotatable guide wheel structure which is not in contact with the smooth placement surface for the paper to be cut, the paper guide member 37 is arranged close to a paper discharging end of the paper cutting device housing 33 and is arranged above the paper bottom layer contact surface 3112, and the paper guide member 37 is fixedly connected to the paper cutting device housing 33 by means of a paper guide mounting member 36. The bottom end of the paper guide member 37 is not in contact with the ground and is in contact with an upper surface of the paper in the whole process, the lowest side of a tire is lower than the height of the peak of the slope, the paper is extruded into an arched arc surface when passing through a small roller in a paper guide process, or the paper guide member 37 is of a fixed semi-circular structure, or a bottom contact surface is of a slope structure, and then the arched paper can be driven and folded.

Preferably, a bottom edge 331 of the paper cutting device housing 33 includes an end surface in contact with the placement surface for the paper to be cut, and the end surface of the bottom edge 331 of the paper cutting device housing 33 is capable of serving as a paper pressing assistance member and can assist in flattening the paper of roll paper.

The paper discharging end of the paper cutting device housing 33 is provided with a paper discharging groove, and the paper discharging groove includes a first paper discharging groove 38 and a second paper discharging groove 39 respectively, which facilitate discharging of the paper after paper cutting. Paper discharged from the first paper discharging groove 38 is cut paper; and paper discharged from the second paper discharging groove 39 is paper of the original paper roll.

The working principle of the present disclosure is as follows: firstly, the roll of the paper to be cut is placed into the paper cutter housing 1 with the accommodating space for accommodating the roll of the paper to be cut, the paper is pulled out of the roll of the paper to be cut from the parallel guide rails 11 on the side close to the paper cutting device 3 to enter the position below the paper cutting device 3, and straight edges of bottom edges of the parallel guide rails 11 on the side are perpendicular such that broad sides of the paper can be aligned, thereby measuring the required paper cutting width; then the paper is cut, the object picking end 3111 of the object picking member 311 picks the paper to be cut away from the placement surface for the paper to be cut, a lower surface of the paper to be cut is attached to an upper surface of the paper bottom layer contact surface 3112, the paper is fed towards the cutting edge 3121 of the cutter 312, the paper pushing member 35 of the guide wheel structure rotates to push an upper surface of the paper to be cut, thus the paper is in the tensioned state to reach the maximum tension, then the upper surface of the paper to be cut enters the paper guide member 37 of a paper guide structure, the paper guide member 37 can extrude the paper to be cut into the paper having the arced arc surface, and then the paper enters the cutting edge 3121 of the cutter 312 for cutting. It should be noted that the paper to be cut can be rolled paper or flat paper, or the paper can be cut without limiting the types of the paper.

The above is merely illustrative of the preferred embodiments of the present disclosure and is not intended to limit the present disclosure, and various changes and modifications may be made on the present disclosure by those skilled in the art. Any modification, equivalent substitution, improvement, etc. made within the spirit and principles of the present disclosure should be included in the scope of protection of the present disclosure.

What is claimed is:

1. A paper cutter, comprising:

a paper cutter housing which comprises an accommodating space for axially accommodating a roll of paper to be cut, wherein a side wall of the paper cutter housing further comprises two parallel guide rails arranged in an axial direction thereof, and the parallel guide rails can serve as contact planes for the paper cutter and a paper cutter placement surface and are applied to positioning, force bearing and supporting during paper cutting and configured to assist the paper cutter in linearly sliding; and a paper cutting device which is connected to the side wall of the paper cutter housing and comprises a paper cutting device housing and a cutter assembly which is connected to the paper cutting device housing, wherein the cutter assembly comprises an object picking member and a cutter, one end of the object picking member is provided with an object picking end, another end of the object picking member is connected to a cutter bearing member, the cutter is mounted in the cutter bearing member; the object picking member picks the paper to be cut away from a placement surface for the paper to be cut and feeds the paper towards a cutting edge of the cutter, and a direction corresponding to the cutting edge of the cutter is opposite to a paper feeding direction of the paper to be cut; and wherein the paper cutting device further comprises a paper guide member, the paper guide member is arranged close to a paper discharging end of the paper cutting device housing and is arranged above a paper bottom layer contact surface, and the paper guide member is connected to the paper cutting device housing by means of a paper guide mounting member.

2. The paper cutter according to claim 1, wherein a free end of the object picking member is an object picking end, and the object picking end is capable of picking the paper to be cut away from the placement surface therefor;

the object picking member further comprises a paper bottom layer contact surface extending from the object picking end to the cutting edge, and the paper bottom layer contact surface is a bearing surface for the paper to be cut; and the paper bottom layer contact surface is a slope gradually rising from the object picking end to the cutting edge.

3. The paper cutter according to claim 2, wherein the cutting edge of the cutter is inclined relative to the paper bottom layer contact surface.

4. The paper cutter according to claim 3, wherein an obtuse angle is formed between an inclination direction of the cutting edge of the cutter and a plane where the paper feeding direction of the paper to be cut is located.

5. The paper cutter according to claim 1, wherein the paper cutting device further comprises a paper cutting device housing and a paper pushing member, the paper pushing member is arranged close to a paper feeding end of the paper cutting device housing and is arranged above a paper bottom layer contact surface, and the paper pushing member is connected to the paper cutting device housing by means of a paper pushing and pressing mounting member.

6. The paper cutter according to claim 1, wherein a bottom edge of the paper cutting device housing comprises an end surface in contact with the placement surface for the paper to be cut, and the end surface of the bottom edge of the paper cutting device housing is capable of serving as a paper pressing assistance member.

7. The paper cutter according to claim 1, wherein the paper cutting device housing is further provided with a cutter assembly mounting groove, the cutter assembly is provided with an elastic buckle, and the elastic buckle is fitted with the cutter assembly mounting groove to connect the cutter assembly to the paper cutting device housing.

8. The paper cutter according to claim 1, wherein the paper discharging end of the paper cutting device housing is provided with a paper discharging groove which is configured to discharge the paper after paper cutting.

9. The paper cutter according to claim 1, wherein the paper cutting device further comprises a cutter bearing member which comprises a cutting blade mounting groove, and the cutter is detachably mounted in the cutting blade mounting groove.

10. The paper cutter according to claim 1, further comprising a holding portion which is arranged on an outer wall of the paper cutter housing.

11. The paper cutter according to claim 10, wherein a force is capable of being applied to the holding portion in a downward inclined direction.

12. The paper cutter according to claim 10, wherein a force is applied to the holding portion such that the paper cutter is subjected to:

pressure perpendicular to a plane formed by the two parallel guide rails; and thrust parallel to a paper discharging direction of the paper to be cut.

* * * * *